United States Patent
Puente et al.

(10) Patent No.: US 10,488,522 B2
(45) Date of Patent: Nov. 26, 2019

(54) LIGHTING AND/OR SIGNALLING SYSTEM COMPRISING TELEMETRY MEANS

(71) Applicant: VALEO VISION, Bobigny (FR)

(72) Inventors: Jean-Claude Puente, Livry Gargan (FR); Pierre Albou, Paris (FR); Vincent Godbillon, Paris (FR)

(73) Assignee: VALEO VISION, Bobigny (FR)

( * ) Notice: Subject to any disclaimer, the term of this patent is extended or adjusted under 35 U.S.C. 154(b) by 431 days.

(21) Appl. No.: 15/521,094

(22) PCT Filed: Oct. 23, 2015

(86) PCT No.: PCT/EP2015/074629
§ 371 (c)(1),
(2) Date: Apr. 21, 2017

(87) PCT Pub. No.: WO2016/062872
PCT Pub. Date: Apr. 28, 2016

(65) Prior Publication Data
US 2017/0357004 A1   Dec. 14, 2017

(30) Foreign Application Priority Data
Oct. 24, 2014   (FR) ...................................... 14 60271

(51) Int. Cl.
*G01S 17/93*   (2006.01)
*F21S 41/675*   (2018.01)
(Continued)

(52) U.S. Cl.
CPC ............. *G01S 17/936* (2013.01); *F21S 41/14* (2018.01); *F21S 41/285* (2018.01); *F21S 41/32* (2018.01);
(Continued)

(58) Field of Classification Search
CPC ...................................................... G01S 7/4814
See application file for complete search history.

(56) References Cited

U.S. PATENT DOCUMENTS

2007/0228262 A1   10/2007   Cantin et al.
2011/0249460 A1   10/2011   Kushimoto
(Continued)

FOREIGN PATENT DOCUMENTS

DE   10 2006 025 020 A1   11/2007

OTHER PUBLICATIONS

International Search Report dated Jan. 18, 2016 in PCT/EP2015/074629 filed Oct. 23, 2015.
(Continued)

*Primary Examiner* — Hovhannes Baghdasaryan
(74) *Attorney, Agent, or Firm* — Oblon, McClelland, Maier & Neustadt, L.L.P.

(57) ABSTRACT

The present invention relates to a lighting system including a primary light source producing a primary light beam in the direction of a conversion device that returns a secondary light radiation to an optical imaging system forming a projected light beam. A light sensor generates a signal corresponding to the light received by this sensor. The light includes a non-converted light part of the first primary light beam which is returned by the conversion device in the projected light beam and is reflected by an obstacle situated in the zone illustrated by said projected light beam. A control unit has modulation means generating a modulation signal for the primary light, and demodulation means for processing the signal formed by said sensor, and determines a distance between the obstacle and the lighting system.

20 Claims, 3 Drawing Sheets

(51) Int. Cl.
G01S 17/32 (2006.01)
G01S 7/481 (2006.01)
G01S 7/491 (2006.01)
F21S 43/13 (2018.01)
F21S 41/14 (2018.01)
F21S 43/20 (2018.01)
F21S 43/31 (2018.01)
F21S 41/20 (2018.01)
F21S 41/32 (2018.01)
G01S 13/93 (2006.01)
F21Y 115/30 (2016.01)

(52) U.S. Cl.
CPC ............ *F21S 41/675* (2018.01); *F21S 43/13* (2018.01); *F21S 43/255* (2018.01); *F21S 43/26* (2018.01); *F21S 43/31* (2018.01); *G01S 7/4814* (2013.01); *G01S 7/4815* (2013.01); *G01S 7/4817* (2013.01); *G01S 7/491* (2013.01); *G01S 17/32* (2013.01); *F21Y 2115/30* (2016.08); *G01S 2013/9396* (2013.01)

(56) References Cited

U.S. PATENT DOCUMENTS

2013/0190971 A1   7/2013   Anderson
2015/0124466 A1   5/2015   Kushimoto

OTHER PUBLICATIONS

French Search Report dated Jul. 7, 2015 in FR 1460271 filed Oct. 24, 2014.

LIGHTING AND/OR SIGNALLING SYSTEM COMPRISING TELEMETRY MEANS

The invention concerns the field of lighting and/or signaling systems designed in particular for motor vehicles.

The invention is interested more particularly in lighting and/or signaling systems which can form a light beam in front of the vehicle, whose dimensions, intensity and/or direction are adaptable in order to allow for traffic conditions.

These systems, described for example in the publication EP 2 063 170, comprise a source of laser type, whose light radiation is distributed spatially, by means of a scanning system, over the surface of a wavelength conversion device which comprises a substrate of transparent material on which is deposited a thin layer of phosphorescent material. This material, not necessarily containing phosphorus, comprises different chemical elements able to emit light after having been illuminated by a primary excitation light.

The conversion device exploits the ability of these materials to restitute the light at a wavelength different from that of the excitation light.

The light radiation passing through the conversion device then appears in the form of a white light when the wavelength of the light restituted by phosphorescence, and thus the choice of the materials making up the phosphorescent layer, is attuned to the wavelength of the excitation light.

The lighting system as described in the reference publication likewise comprises an optical imaging system which receives the white light coming from the wavelength conversion device and projects this light in front of the vehicle to form a light beam. The conversion device is situated preferably in the vicinity of the focal plane of the optical imaging system.

However, it is observed that the white light perceived by the human eye at the output of the conversion device is in fact the sum of a part of the primary light, of a given color, which has not been converted, and the light converted by the conversion device of a different color. The mixing of these two colors then appears in the form of a white light.

It is likewise observed that the diffusion of the phosphorescence light restituted by the conversion device carries out slow processes of passage of the molecules of the phosphorescent material from a singlet state to a triplet state, followed by a radiative de-excitation, whereas the diffusion of the light coming from the primary source is almost instantaneous.

The invention proposes to take advantage of these two observations.

The lighting and/or signaling system according to the invention comprises:
a first primary light source producing a first primary light beam of given wavelength,
a first wavelength conversion device receiving the first primary light beam and returning a secondary light radiation,
an optical imaging system receiving the secondary light radiation returned by the conversion device and forming a projected light beam in the direction of a zone to be lit,
This lighting system is characterized in that it comprises:
a first light sensor generating a signal corresponding to the light received by this sensor, which light comprises a non-converted light part of the first primary light beam which is returned by the conversion device in the projected light beam and which is reflected by an obstacle situated in the zone lit by said projected light beam,
a control unit comprising:
first modulation means for generating a modulation signal for the first primary light,
first demodulation means for processing the signal formed by said first light sensor, and determining a first distance between said obstacle and the lighting system.

The system according to the invention thus makes it possible, in a simple and inexpensive manner, to obtain an evaluation of the distance of an obstacle situated in the projected light beam used for illumination.

The system likewise comprises the following additional characteristics:

A first filter is placed at an entrance of the first light sensor, to let through only light of wavelength identical or close to the wavelength of the primary light emitted by the first primary light source.

The wavelength of the first primary light emitted by the first primary light source is less than 500 nm, and preferably between 400 nm and 470 nm.

The projected light beam coming from the optical imaging system is white in color.

The first modulation means of the first primary light are provided to generate a sinusoidal signal modulated at very high frequency, and to superimpose this signal on a carrier signal, with frequency content limited to lower frequencies.

The frequency of the modulated sinusoidal signal is higher than 1 GHz.

The modulated sinusoidal signal is affected by a phase modulation varying in the form of periodic ramps, preferably linear ones, whose frequency lies between 10 MHz and 100 MHz.

The first demodulation means comprise:
a nonlinear mixer to combine the modulation signal of the primary light with the signal generated by the light sensor,
a low pass filter to eliminate the high frequencies of the signal coming from the nonlinear mixer so that the output signal of the low pass filter has a frequency proportional to the first distance between said obstacle and the lighting system.

The first primary light source is a laser, and preferably a diode laser.

The lighting system further comprises:
scanning means receiving the first primary light beam coming from the first primary light source and distributing said first primary light beam over a surface of the conversion device by controlling the spatial position of said first primary light beam,
image processing means associated with the control unit, to create a three-dimensional image of the relief illuminated by the secondary light beam by associating the spatial position of the first primary light beam with the first distance measured for this position.

According to a second embodiment of the invention, the system comprises:
a second primary light source producing a second primary light beam of given wavelength, and directed toward the conversion device, so as to be integrated in the light beam coming from the optical imaging system,
a second light sensor, generating a signal corresponding to the light received by this second light sensor, comprising a part of the light coming from the second primary light beam returned by the conversion device in the projected light beam and which is reflected by an obstacle situated in the zone illuminated by said projected light beam, a second modulation means integrated in the control unit to generate a modulation signal of the second primary light, a second demodulation means, integrated in the control unit, to process the signal generated by the second light sensor, and to determine a second distance between said obstacle and the lighting system.

The second primary light beam has a wavelength which is located in a spectrum not visible to the human eye, and which is adapted so as not to be transformed by the conversion device, so that the light beam coming from the second primary light source is entirely reflected by the conversion device in the direction of the optical imaging system.

The wavelength of the second light beam coming from the second primary light source is greater than 800 nm.

The second modulation means of the second primary light is provided to generate a sinusoidal signal modulated at very high frequency, and to superimpose this signal on a carrier signal with frequency content limited to lower frequencies.

The lighting system further comprises a mirror reflecting the light of a wavelength equal to the wavelength of the second light beam coming from the second primary light source and transparent to light of different wavelength, onto which are directed the light beams coming respectively from the first and the second primary light source in order to be returned to the conversion device via the scanning means.

The scanning means, the first and the second primary light source are controlled so that an image formed on the conversion device by the beam coming from the first primary light source is strictly included in an image formed on this device by the beam coming from the second primary light source.

The invention finally concerns a motor vehicle comprising at least one lighting and/or signaling system as claimed in at least one of the preceding claims.

The invention will be better understood after perusal of the appended figures, which are provided as examples not having any limiting nature, in which:

FIG. 4 is a schematic view of the system according to a second embodiment of the invention, According to a first embodiment of the invention, the lighting system described in FIG. 1 comprises a first primary radiation source 101 producing a first primary light beam $L_1$ whose wavelength is known and calibrated. Downstream from the first primary source are arranged first optical means 111 of focusing the light so as to obtain a collimated primary light beam able to be directed precisely within the lighting system.

Figure 1:
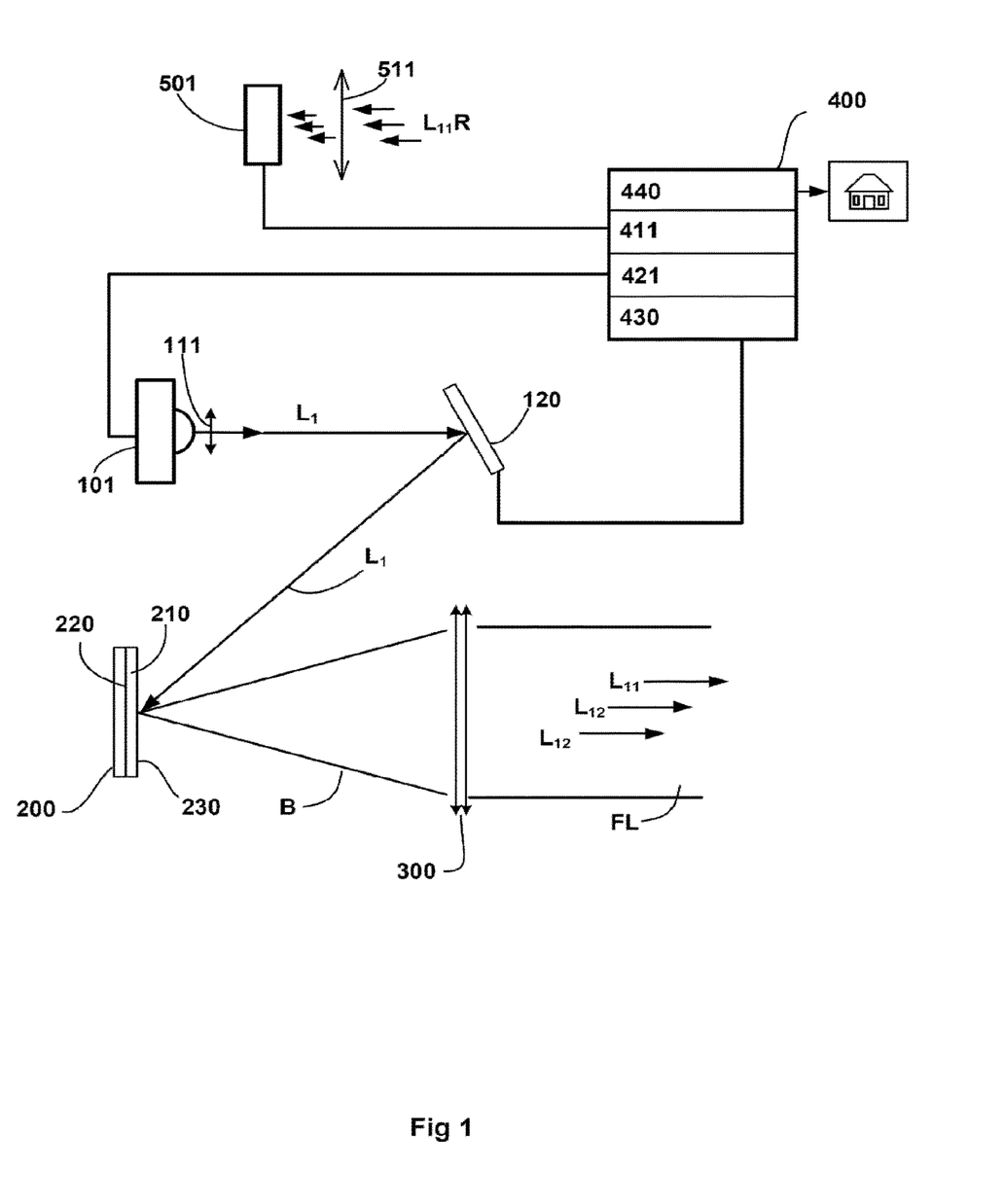
FIG. 1 is a schematic view of the system according to a first embodiment of the invention.

Thus, the primary light source 101 is preferably formed by a laser, such as a diode laser. The diode laser in particular has the advantage of being easily modulated in intensity by varying the DC power supply above the threshold value. And by varying the intensity of the light emitted at very high frequencies, of the order of several GHz.

The wavelength of the beam $L_1$ coming from the first primary light source 101 is less than 500 nm and can usefully be between 400 nm and 470 nm. Good results have been obtained with a wavelength close to 450 nm. These wavelengths correspond to colors ranging from blue to near ultraviolet, which have the advantage of being seldom present in the natural environment.

The first primary light beam $L_1$, coming from the first primary source 101, is directed by means of a mirror 120 onto a wavelength conversion device 200.

The mirror 120 can be a fixed mirror or, preferably, a scanning mirror formed by a single mirror able to move about two orthogonal axes, and controlled by scanning means 430 integrated in a control unit 400.

The first primary light beam $L_1$ is diverted into two directions by the scanning system 120, and intercepts the scanning surface 230 situated on the conversion device 200 on which it creates an image.

The source of laser radiation 101 and the scanning means 120 can usefully be mounted in an integrated system making use of micromechanical and microelectronic (MEMS) components.

The conversion device 200 can be of the traversing type such as that described in the already cited publication EP 2 063 170 or, preferably, of the reflecting type.

It is noted in fact that when the radiation coming from the primary source passes through the conversion device, the phenomena of absorption by the substrate made of transparent material and the parasitic reflections of the radiation passing through the diopters of the conversion device limit the power restituted by the device by reason of the fact that a major portion of the light converted is radiated in unwanted directions. Moreover, the substrate of transparent material is generally polycarbonate or glass, which are materials known to have poor thermal conductivity.

Thus, it will be preferable to use a mirror-forming substrate 220 covered by a layer of phosphorescent material 210. The scanning system and the optical imaging system 300 are then situated on the same reflecting side of the mirror, so that the radiation emitted by the primary source no longer passes through the transparent substrate, and that the light emitted is sent directly to an optical system 300. The radiation losses, and thus the parasitic heating, are thus significantly diminished.

Each point of the scanning surface 230 of the conversion device 200 impinged upon by the first primary light beam $L_1$ re-emits a light $L_{12}$ of different wavelength.

Figure 2:
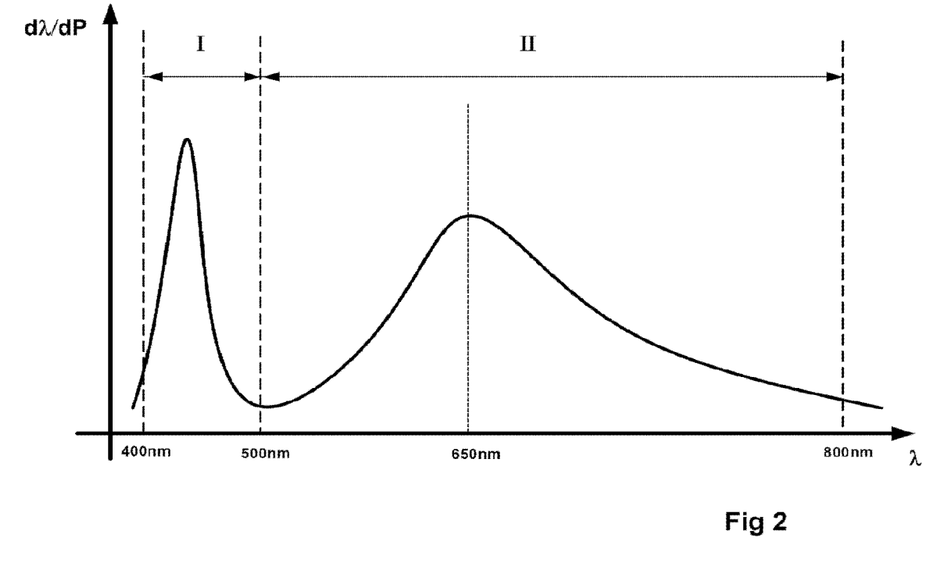
FIG. 2 shows a diagram for the distribution of light intensities returned by the conversion device as a function of the wavelength.

This emission light mixes indiscriminately the light of different wavelengths greater than the wavelength of the laser source, and distributed in the spectrum of visible light between 500 nm and 800 nm, as illustrated in FIG. 2, which shows the diagram of the luminous power returned by the conversion device as a function of the wavelength. The light re-emitted by the wavelength conversion device (emission light) is represented in zone II.

Phosphorescent molecules possess the property of absorbing luminous energy (excitation light) and slowly restituting it in the form of phosphorescent light (emission light). Once the excitation energy is absorbed, the molecules then find themselves in an electronically excited state. The return to the fundamental state followed by the emission of photons occurs through a transition step which is not allowed by quantum mechanics, but which is made possible by spin-orbital coupling. This transition phase is not instantaneous, which explains why the emission of photons of phosphorescent light is distributed over a period of time subsequent to the instant of excitation. Thus, for a collection of molecules, these transitions are distributed over time.

As a result, the modulations of the primary source beyond a certain frequency, of the order of several thousand Hz, will be absorbed by the conversion device.

However, as has been mentioned above, a portion of the light coming from the first primary light beam $L_1$ is not converted. This light $L_{11}$, of the same wavelength as the first primary light, represented in zone I of FIG. 2, is reflected directly by the conversion device in the direction of the optical imaging system 300.

Thus, the secondary light B returned by the conversion device is composed of the sum of the part of light of the converted first primary beam $L_{12}$ (emission light) and the part of light of the first primary beam $L_{11}$ reflected directly by the conversion device 200. It may appear as a light of white color when the materials forming the phosphorescent layer 210 of the conversion device 200 are chosen accordingly, so as to attune the spectrum of the emission light to the wavelength of the primary light emitted by the primary light source 101. This color can be modified by appropriate selection of the phosphorescent materials or the wavelength of the primary light.

The invention is based on the possibility, with the aid of first modulation means 421 integrated in the control unit 400, of phase modulation of the amplitude of the electric field powering the first primary source generating the first primary light beam $L_1$. The secondary light B returned by the conversion device and which is directed onto the optical imaging system 300 reproduces this modulation in being composed in part of the nonconverted primary light $L_{11}$. This part of nonconverted light can then be utilized to obtain information regarding the surroundings.

This modulation remains imperceptible to the human eye when its frequency is elevated.

The conversion device is preferably placed in the immediate vicinity of the focal plane of the optical system 300, such that the total secondary light B returned by the conversion device 200 forms at infinity an image of the surface 230 of the conversion device excited by the first primary light beam $L_1$. The optical imaging system 300 forms a projected light beam FL composed of the light $L_{12}$ re-emitted by the different points of the layer of phosphorescent material in response to the laser excitation (emission light), and the unconverted light of the primary beam $L_{11}$.

The phenomena described above are similar when the conversion device does not contain a mirror-forming substrate, and when the first primary light beam $L_1$ coming from the first primary source 101 passes through the conversion device.

Figure 3:
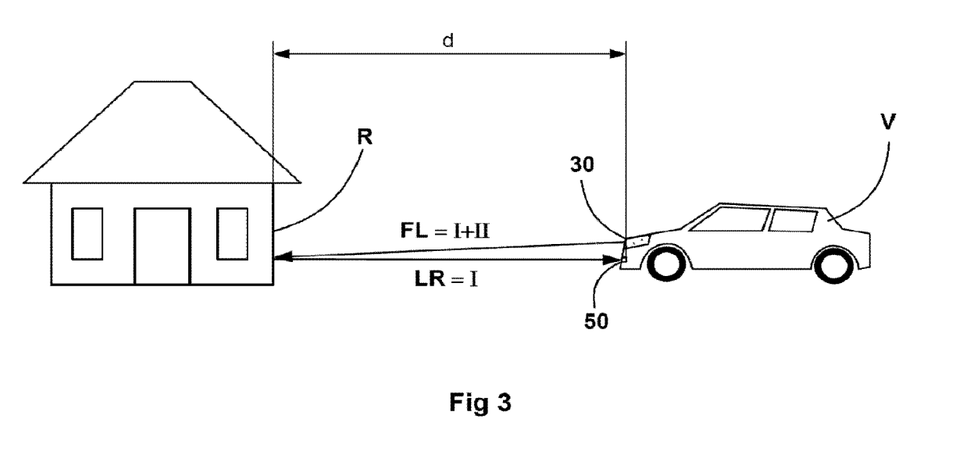
FIG. 3 is a schematic view of a vehicle comprising a lighting device according to the invention.

The projected light beam FL emitted by the imaging system, forming for example the lighting system of a vehicle V as illustrated in FIG. 3, may encounter an obstacle R in its path. This obstacle R returns in the direction of the vehicle a portion of the projected light FL which it receives.

A first light sensor 501, placed in the front of the vehicle, collects the light coming from the surroundings. And a portion of this received light $L_{11}R$ is made up of the light returned by said obstacle and coming from the projected light beam FL, which contains a portion of modulated light coming from the nonconverted primary light beam $L_{11}$.

To avoid parasitic lights, it proves useful to place a first filter 511 at the entrance of the first light sensor 501, adapted to only let through light with wavelength identical or close to the wavelength of the first primary light $L_{11}$ emitted by the first primary source 101. By close is meant here a pass band with a width between +/−10 nm in relation to the wavelength of the first primary source. The filter can be formed of a colored glass, or for greater precision it can be of interference type.

The only remaining light $L_{11}R$ seen by the first sensor 501 is thus composed in large measure of the light coming from the first modulated beam of primary light $L_{11}$ reflected directly by the conversion device 200 and contained in the projected light beam FL coming from the optical imaging system. When the wavelength of the first primary source is distant from ambient light sources, as is the case with the blue light produced by the diode laser, one observes that practically all the light received by the light sensor 501 comes from the projected light beam FL.

Advantageously, it is arranged so that the dimension of the first light sensor 501 is large enough so as to absorb the angular discrepancies due to the position of different obstacles. One can also add an adapted optics 511 in front of the first light sensor 501 to limit the field studied and capture more light regardless of the direction in which the obstacle is situated.

It is thus possible, at the level of a first demodulator 411 contained in the control unit 400, to analyze this light carrying this modulation in order to extract information as to the distance of the location of the obstacle R on which the projected light beam FL was reflected, revealing the offset between the signal emitted and the signal received. This offset is connected to the time of movement of the light over the distance d separating the obstacle R and the vehicle V, as illustrated in FIG. 3.

The control unit 400 comprises a first modulator 421 able to modulate the amplitude of the electric field powering the light source 101. The determination of the form of the modulation is guided by the choice of the information which one wishes to obtain.

A first form of modulation consists in sending a pulse or a pulse train as is commonly used in telemetry. This method may be suitable for evaluating a simple distance, such as may be the case when the mirror 120 is fixed and one is using a primary light source other than a laser.

However, this technology proves to be limited when one wishes to reconstitute a complete three-dimensional image of obstacles illuminated by the projected light beam FL, as shall be explained in the following.

It is proposed, according to the invention, to amplitude modulate the electric field powering the first primary light source in order to obtain a light signal which is phase modulated in the form of ramps, preferably linear ramps. The primary light thus combines a first sinusoidal carrier signal, of rather low frequency content, with a second sinusoidal signal modulated at high frequency. This is easily accomplished with a diode laser by adding an alternating component to the DC power supply.

This modulation will be of the type:

$$A * \cos\left(2\pi\left(f + \frac{\Delta f}{\Delta T}t\right)t\right).$$

where A represents the mean amplitude of the signal, f the frequency of a second sinusoidal signal phase modulated by a linear ramp $$\left(\frac{\Delta f(t)}{\Delta T}\right)$$

of period $\Delta T$.

The signal received at the level of the light sensor 501 after filtering will thus be of type:

$$A' * \cos\left(2\pi\left(f + \frac{\Delta f}{\Delta T}\left(t - \frac{2d}{c}\right)\right)t\right).$$

where d represents the distance between the obstacle R and the imaging system 300, and c is the speed of light.

After appropriate corrections and calibrations, it is possible in the area of the first demodulator 411 to carry out a multiplication of these two signals with each other.

Applying the rules of trigonometry, one obtains a product of the form:

$$\frac{A * A'}{2}\left[\cos\left(2\pi\frac{\Delta f}{\Delta T}\frac{2d}{c}t\right) + \cos\left(2\pi\left(2f + \frac{\Delta f}{\Delta T}\left(2t - \frac{2d}{c}\right)\right)t\right)\right]$$

This product is the sum of a low-frequency sinusoidal component $$\cos\left(2\pi\frac{\Delta f}{\Delta T}\frac{2d}{c}t\right),$$

whose frequency is proportional to the distance d, and of a component of very high frequency, $$\cos\left(2\pi\left(2f + \frac{\Delta f}{\Delta T}\left(2t - \frac{2d}{c}\right)\right)t\right),$$

It is then possible, with the aid of a low pass filter, to eliminate the high-frequency component of this product and measure the frequency of the remaining signal, which is proportional to the distance d at which the obstacle R is located, in order to have an estimate of this distance d.

The first demodulator 411, which receives the signal coming from the first light sensor 501, thus comprises an analog multiplier, or more precisely, given the very high frequencies involved, a nonlinear mixer, as well as a low pass filter, operating on the principles explained above, as well as a frequency analyzer able to determine a first distance $d_1$.

The first modulator 421 and the first demodulator 411 obviously operate in a synchronized manner.

This method of signal processing proves to be especially interesting when one wishes to reconstitute a three-dimensional image of obstacles illuminated by the projected light beam FL.

It may also prove interesting to take advantage of a lighting device in which the mirror 120 is driven in a scanning movement, and in which the primary light source 101 is a laser of diode laser type.

The scanning means comprise the mirror 120 associated with control means 430 installed in the control unit 400. The movement of the mirror 120 makes it possible to direct the primary light beam $L_1$, and to impinge on each of the points of the scanning surface 230 of the conversion device 200, at a given scanning frequency, being of the order of several tens of Hz. By appropriately driving the cutting out of the laser source, one can constitute an image adaptable at will of the primary light source on the scanning surface and obtain the desired shape of the beam FL projected via the optical system 300.

It is then possible, knowing the position of the mirror 120, to deduce from this at each instant the point of the scanning surface 230 illuminated by the first primary light beam $L_1$. One can then know in precise fashion the optical path, and thus the direction in space, of the light ray $L_{11}$ forming a component of the secondary light beam B and the projected light FL, which is of the same wavelength as the first primary light beam $L_1$, and which is reflected directly at this point of the scanning surface 230 by the conversion device 200 without having undergone a transformation of wavelength.

This light ray $L_{11}$ is slightly dispersed and will impinge on an obstacle in pointlike fashion. The light $L_{11}R$ reflected by the obstacle R and received by the first light sensor 501 will thus be representative of a first distance $d_1$ between this point of the obstacle R and the lighting system.

One can then associate this first measured distance $d_1$ with a given optical path and a precise point of the scanning surface 230.

In order to increase the precision of the device, one will arrange the scanning frequencies and the modulation frequencies of the primary beam so that it is possible to consider that each point of the scanning surface, then associated with a pixel, reflects a light ray comprising a large number of periods of the modulated signal in ramp form.

The frequency of the modulated signal generated by the first modulator 421 which is part of the control unit 400 can usefully have a value greater than or equal to 1 GHz. And the frequency of reproduction of the ramps can be between 10 MHz and 100 MHz.

The frequency of the carrier signal, which is complex and corresponds to the image constituting the beam projected by the system, can be much lower, and less than 1 kHz, being usefully between 100 Hz and 500 Hz.

Each point, or pixel of the scanning surface, is thus associated with a first distance $d_1$, which makes it possible for an image processing module 440 being part of the control unit 400 to reconstitute the relief image illuminated by the projected light beam FL.

The device according to the invention can thus bring together within a single assembly a means of lighting or signaling and a means of forming a three-dimensional map of obstacles situated in the projected light beam generated by the lighting system.

This relief image can then be used for safety purposes, to detect the presence of an unforeseen obstacle, or to regulate the distances between vehicles, or for any other use of interest to assist the driving of a vehicle.

Figure 4:
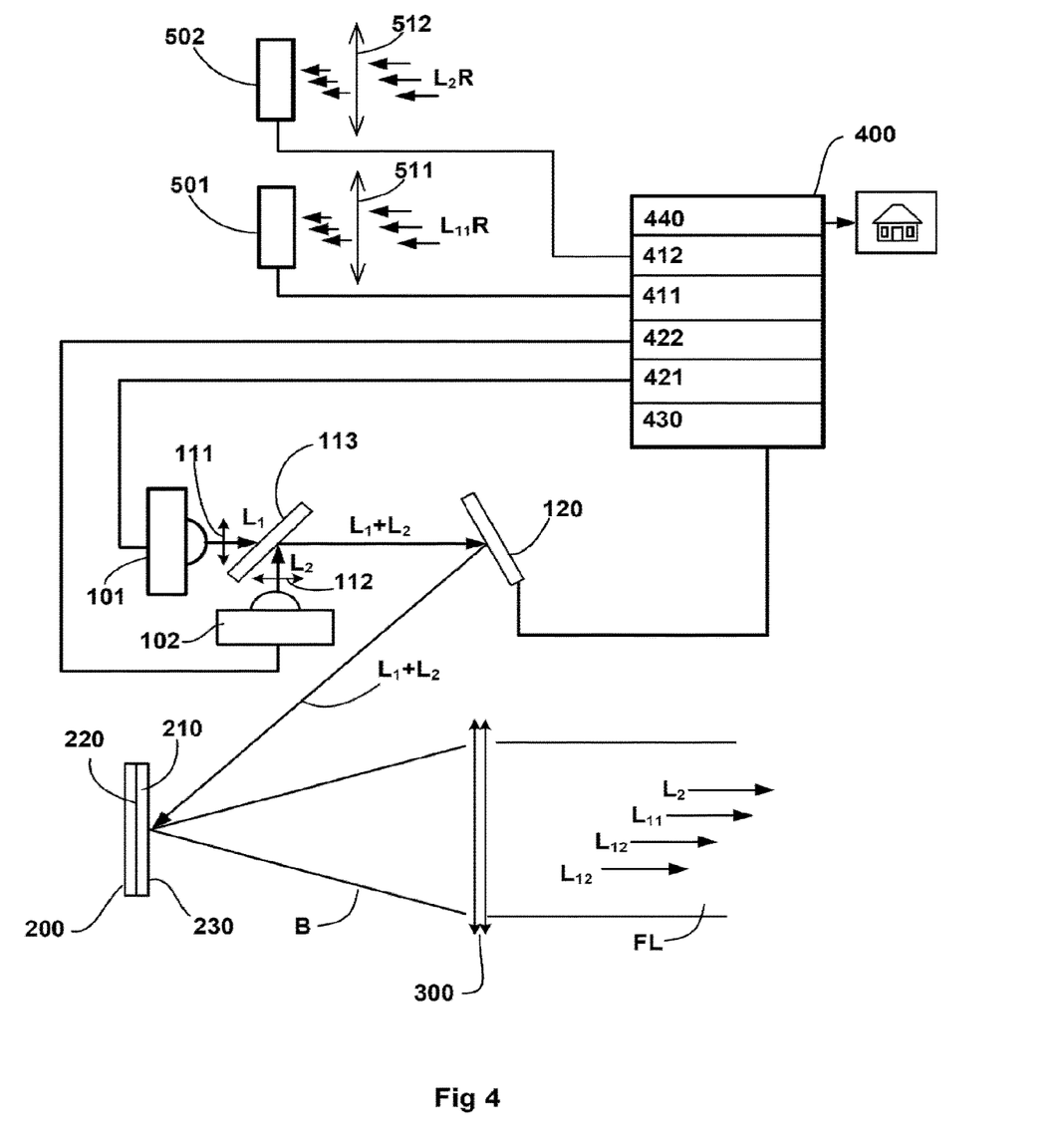

The invention likewise calls for a second embodiment, as illustrated in FIG. 4, where the lighting system comprises a second primary light source 102 whose wavelength is different from that of the first primary light source and is preferably situated in wavelengths lying outside the spectrum visible to the human eye.

The beam $L_2$ emitted by the second source 102 is directed through an optics 112 onto a mirror 113, which is reflecting to light having the same wavelength as the light emitted by the second primary light source 102, but transparent to lights having other wavelengths and in particular that of the light emitted by the first primary light source 101. Thus, the beam of light coming from the mirror 113 is formed by the beam $L_1$ passing through the mirror 113 and coming from the first primary light source 101, and the beam $L_2$ reflected by the mirror 113 and coming from the second primary light source 102.

This composite beam is then directed onto the conversion device 120 by means of the scanning mirror 120.

It is likewise arranged that the wavelength of the light emitted by the second primary light source does not excite the phosphor of the conversion device, and it is outside the wavelength range for which the conversion device is operative. In other words, it is arranged that the beam $L_2$ is entirely reflected by the substrate 220 of the conversion system 200.

Preferably, one will choose a diode laser emitting in the infrared with wavelength greater than 800 nm as the second primary light source 102.

The secondary light B returned by the conversion device is thus composed of the sum of the part of the converted primary light beam $L_{12}$ (emission light) and the part of light of the primary beam reflected directly by the conversion device $L_{11}$, but also of light coming from the second primary source $L_2$.

This light appears with white color for the same reasons as those explained above, and it is not modified by the light of wavelength $L_2$ which is not in the spectrum of visible light.

By the same principles as those described in the preceding paragraphs, the light coming from the second primary source 102 is modulated by a second modulator 422 able to modulate the amplitude of the electric field powering the second primary light source 102 in order to obtain a light signal superimposed on a carrier signal which is phase modulated in the form of preferably linear ramps.

The frequency of modulation can be on the same order as that used for the primary source.

The light $L_2R$ reflected by the obstacle R is detected by the second light sensor 502 outfitted with a filter 512 only letting through the light of wavelength identical or close to the wavelength coming from the second primary light source $L_2$, and which is placed at the front of the vehicle.

The signal coming from the second sensor 502 is then processed by the second demodulator 412 placed in the control unit 400 by the same principles as those explained for the operation of the first demodulator 411.

It is then possible, as already explained, to associate a second measured distance $d_2$ with a given optical path and a precise point of the scanning surface 230 in order to reconstitute a 3D image of the surroundings illuminated by the vehicle.

When the light beams $L_{11}$ and $L_2$ are directed onto a same point of space, the distances $d_1$ and $d_2$ are identical.

The image processing module then receives two pieces of distance information and can reconstitute the terrain with better precision.

However, the interest of this variant embodiment of the invention resides in the fact that it is possible to use the second primary light source as a supplement to the first primary light source when this first source is not activated or is not illuminating zones of space whose profile one wishes to determine.

This situation occurs when the vehicle is traveling under sufficient natural lighting conditions. The first primary light source 101 is switched off. It is then possible to activate the second primary light source 102 and to project by the lighting system of the vehicle only the modulated light $L_2$ coming from the second primary light source. One then obtains a relief image making it possible to keep the safety and watchdog functions active. This light source remains invisible to the human eye.

The second situation in which this device comprising the two primary light sources proves to be particularly advantageous is the one which occurs when the image projected by the lighting system and coming from the first primary light source needs to be partly modified so as not to blind vehicles coming from the opposite direction. One then proceeds to switch off the first primary light source when the beam coming from the mirror 120 is meant to be directed toward zones not needing to be illuminated, such as the upper left section of the dashboard when the vehicle has its driving seat on the right side. The information regarding the relief present in this zone then comes solely from the image provided from the second primary light source $L_2$. This layout makes it possible to increase the size of the 3D image in the vertical direction, among other things.

A third advantage, finally, resides in the fact that it is possible to enlarge the image formed by the secondary light beam B by increasing the size of the image formed on the mirror 220 of the conversion device. The primary light source is then only activated to form the image of the light beam serving for the lighting proper, and whose size is reduced in relation to the overall image emitted by the mirror 220. One obtains an enlarged composite 3D image from the light emitted by the first primary light source 101 and corresponding to the terrain illuminated by the beam of white light supplemented by the composite 3D image from the light emitted by the second primary light source 102 and corresponding to the terrain located outside the zone illuminated by the beam of white light.

In these three configurations, the image formed by the first primary light beam $L_1$ on the conversion device 200 is strictly included in the image formed on this device by the second primary light beam $L_2$.

It will be understood that the lighting system will be used during nighttime conditions or in a dark setting (bad weather or a tunnel, for example) by generating the usual light beams for these driving conditions, of the low beam or high beam type in particular, and that it may likewise be used in daytime conditions by generating at least a portion of a signaling beam of the position light or daytime running light (DRL) kind, obtained by modulation of the scanning pulse width. Thus, the system according to the invention can be functional in all driving situations and conditions of the vehicle outfitted with this system.

The preferred embodiments of the invention serving as the basis of the present description are not limiting, and may be subject to variants allowing one to achieve the technical effects as described and claimed, or equivalent effects.

The invention claimed is:

1. A lighting and/or signaling system, especially for a motor vehicle, comprising:
   a first primary light source producing a first primary light beam (L1) of given wavelength,
   a first wavelength conversion device receiving the first primary light beam ($L_1$) and returning a secondary light radiation (B),
   an optical imaging system receiving the secondary light radiation (B) returned by the conversion device and forming a projected light beam (FL) in the direction of a zone to be lit, the light beam comprising:
      a first light sensor generating a signal corresponding to the light ($L_{11}R$) received by this sensor, which light comprises a non-converted light part ($L_{11}$) of the first primary light beam ($L_1$) which is returned by the conversion device in the projected light beam (FL) and which is reflected by an obstacle (R) situated in the zone lit by said projected light beam (FL), a control unit comprising:
first modulation means for generating a modulation signal for the first primary light ($L_1$),
first demodulation means for processing the signal formed by said first light sensor, and determining a first distance ($d_1$) between said obstacle (R) and the lighting system.

2. The lighting system according to claim 1, further comprising a first filter placed at an entrance of the first light sensor, capable of letting through only light of wavelength identical or close to the wavelength of the primary light ($L_1$) emitted by the first primary light source.

3. The lighting system according to claim 1, wherein the wavelength of the first primary light ($L_1$) emitted by the first primary light source is less than 500 nm, and preferably between 400 nm and 470 nm.

4. The lighting system according to claim 1, wherein the projected light beam (FL) coming from the optical imaging system is white in color.

5. The lighting system according to claim 1, wherein the first modulation means of the first primary light ($L_1$) are provided to generate a sinusoidal signal modulated at very high frequency, and to superimpose this signal on a carrier signal, with frequency content limited to lower frequencies.

6. The lighting system according to claim 5, wherein the frequency of the modulated sinusoidal signal is higher than 1 GHz.

7. The lighting system according to claim 5, wherein the modulated sinusoidal signal is affected by a phase modulation varying in the form of periodic ramps, preferably linear ones, whose frequency lies between 10 MHz and 100 MHz.

8. The lighting system according to claim 5, wherein the first demodulation means comprise:
a nonlinear mixer to combine the modulation signal of the primary light ($L_1$) with the signal generated by the light sensor,
a low pass filter to eliminate the high frequencies of the signal coming from the nonlinear mixer so that the output signal of the low pass filter has a frequency proportional to the first distance ($d_1$) between said obstacle (R) and the lighting system.

9. The lighting system according to claim 1, wherein the first primary light source is a laser, and preferably a diode laser.

10. The lighting system according to claim 9, further comprising:
scanning means receiving the first primary light beam ($L_1$) coming from the first primary light source and distributing said first primary light beam ($L_1$) over a surface of the conversion device by controlling the spatial position of said first primary light beam ($L_1$),
image processing means associated with the control unit, to create a three-dimensional image of the relief illuminated by the secondary light beam (FL) by associating the spatial position of the first primary light beam ($L_1$) with the first distance ($d_1$) measured for this position.

11. The lighting system as according to claim 10, comprising:
a second primary light source producing a second primary light beam ($L_2$) of given wavelength, and directed toward the conversion device, so as to be integrated in the light beam (FL) coming from the optical imaging system,
a second light sensor, generating a signal corresponding to the light ($L_2R$) received by this second light sensor, comprising a part of the light coming from the second primary light beam ($L_2$) returned by the conversion device in the projected light beam (FL) and which is reflected by an obstacle (R) situated in the zone illuminated by said projected light beam (FL),
a second modulation means integrated in the control unit to generate a modulation signal of the second primary light ($L_2$),
a second demodulation means, integrated in the control unit, to process the signal generated by the second light sensor, and to determine a second distance ($d_2$) between said obstacle (R) and the lighting system.

12. The lighting system according to claim 11, wherein the second primary light beam ($L_2$) has a wavelength which is located in a spectrum not visible to the human eye, and which is adapted so as not to be transformed by the conversion device, so that the light beam ($L_2$) coming from the second primary light source is entirely reflected by the conversion device in the direction of the optical imaging system.

13. The lighting system according to claim 12, wherein the wavelength of the second light beam ($L_2$) coming from the second primary light source is greater than 800 nm.

14. The lighting system according to claim 11, wherein the second modulation means of the second primary light ($L_2$) is provided to generate a sinusoidal signal modulated at very high frequency, and to superimpose this signal on a carrier signal with frequency content limited to lower frequencies.

15. The lighting system according to claim 11, comprising a mirror reflecting the light of a wavelength equal to the wavelength of the second light beam ($L_2$) coming from the second primary light source and transparent to light of different wavelengths, onto which are directed the light beams ($L_1$, $L_2$) coming respectively from the first and the second primary light source in order to be returned to the conversion device via the scanning means.

16. The lighting system according to claim 15, wherein the scanning means, the first and the second primary light source are controlled so that an image formed on the conversion device by the beam ($L_1$) coming from the first primary light source is strictly included in an image formed on this device by the beam ($L_2$) coming from the second primary light source.

17. A motor vehicle comprising at least one lighting and/or signaling system according to claim 1.

18. The lighting system according to claim 2, wherein the wavelength of the first primary light ($L_1$) emitted by the first primary light source is less than 500 nm, and preferably between 400 nm and 470 nm.

19. The lighting system according to claim 3, wherein the projected light beam (FL) coming from the optical imaging system is white in color.

20. The lighting system according to claim 4, wherein the first modulation means of the first primary light ($L_1$) are provided to generate a sinusoidal signal modulated at very high frequency, and to superimpose this signal on a carrier signal, with frequency content limited to lower frequencies.

* * * * *